United States Patent Office 2,877,087
Patented Mar. 10, 1959

---

2,877,087

URANIUM SEPARATION PROCESS

William H. McVey and William H. Reas, Berkeley, Calif., assignors to the United States of America as represented by the United States Atomic Energy Commission No Drawing. Application February 2, 1948
Serial No. 5,893

9 Claims. (Cl. 23—14.5)

---

This invention relates to the separation of uranium from an aqueous solution and more particularly relates to the separation of uranium from a mixture of uranium and thorium by the use of an aqueous solution of water-soluble salts of said mixture.

Neutronic reactors, for example, the uranium-graphite pile, have been developed for the production of plutonium by neutron bombardment of natural uranium, whereby there is fission of the uranium isotope, $U^{235}$, due to slow or thermal neutrons. In addition, there is neutron absorption by the uranium isotope, $U^{238}$, to form $U^{239}$, which decays to the neptunium isotope, $Np^{239}$, and it decays to the plutonium isotope, $Pu^{239}$. In such reactors it has been found that the neutrons which would normally escape from the reactor can be utilized by placing a blanket of thorium or a thorium-containing material, such as thorium oxide, around the reactor. The chief isotop of natural thorium is $Th^{232}$. It absorbs neutrons to produce $Th^{233}$, which undergoes beta decay with a half-life of 23.5 minutes to the protoactinium isotope, $Pa^{233}$, which has a half-life of 27.4 days, and which forms $U^{233}$ by beta decay. In addition, some of the neutrons escaping from the uranium neutronic reactor are fast neutrons and these with slow neutrons cause fission of $Th^{232}$ and some of the $U^{233}$ produced. There is produced radioactive fission fragments. By use of the thorium blanket desirable $Pa^{233}$ and $U^{233}$ are produced. With a suitable aging period most of the $Pa^{233}$ is converted to $U^{233}$; however, the maximum amount of $U^{233}$ that may be obtained will be about 1% based on the $Th^{232}$ content of the blanket and in the usual case the $U^{233}$ content will be less than 0.1%. Thus, the problem arose of developing a process for the separation of uranium from its mixture with thorium in which the thorium-to-uranium ratio was quite high. Another problem is the separation of the uranium from the radioactive fission products.

It is an object of the present invention to separate uranium from an aqueous solution of a uranium salt.

Another object of this invention is to separate uranium from a mixture of uranium and thorium.

Still another object of the present invention is to separate uranium from most of the fission products produced by neutron bombardment of thorium.

Other objects of this invention will be apparent from the description which follows.

I have found that uranium can be separated as a uranium compound from an aqueous solution containing a water-soluble uranyl salt by the process which comprises adding an alkali thiocyanate to an aqueous solution of a water-soluble uranyl salt, contacting the resultant solution with methyl isobutyl ketone and separating the resultant aqueous phase and methyl isobutyl ketone phase containing uranyl thiocyanate. Suitable water-soluble uranyl salts include uranyl chloride ($UO_2Cl_2$) and uranyl nitrate ($UO_2(NO_3)_2$), and suitable alkali thiocyanates include potassium thiocyanate, ammonium thiocyanate, and sodium thiocyanate. For maximum separation of uranium from the aqueous solution at least the stoichiometric amount of alkali thiocyanate should be added based, for example, on the following equation where uranyl nitrate and potassium thiocyanate are used.

$$UO_2(NO_3)_2 + 2KSCN \rightarrow 2KNO_3 + UO_2(SCN)_2$$

The volume ratio of aqueous solution to methyl isobutyl ketone may be varied widely and the preferred range is between 5 to 1 and 1 to 5. The contact time between these two liquid media is preferably at least fifteen minutes to provide adequate time for the transfer of uranyl thiocyanate from the aqueous phase to the methyl isobutyl ketone phase. The temperature of extraction is suitably between room temperature and 90° C. Methyl isobutyl ketone is commonly known as hexone.

In one embodiment of this invention uranium is separated from an aqueous solution of a uranyl salt in accordance with the steps outlined in the preceding paragraph.

In another embodiment of this invention uranium is separated from its mixture with thorium by adding an alkali thiocyanate to an aqueous solution of said mixture wherein the uranium is in solution as a uranyl salt and thorium is present as a tetravalent thorium salt. The resultant solution is contacted with methyl isobutyl ketone and the aqueous and ketone phases are separated. As will be shown below most of the thorium remains in the aqueous solution, whereas a considerable portion of uranium as uranyl thiocyanate is extracted by the ketone phase. The amount of alkali thiocyanate, the volume ratio of aqueous solution to methyl isobutyl ketone, and other conditions are those outlined above.

The extraction of thorium is small and can be reduced by having in the aqueous solution a water-soluble sulfate, such as sulfuric acid and alkali sulfates, preferably sodium sulfate. These sulfates provide sulfate ions, which tend to complex thorium and thereby reduce the tendency to form thorium thiocyanate. It is desirable to use a lower molar concentration of sulfate than the molar concentration of water-soluble thorium salt in order to avoid precipitation of thorium sulfate from the aqueous solution. For example, it was found that using an aqueous solution containing 0.504 M thorium nitrate ($Th(NO_3)_4$), 0.0974 M uranyl nitrate, 0.5 M nitric acid and 1 M potassium thiocyanate the maximum concentration of sodium sulfate that could be used without precipitation of thorium sulfate was about 0.35 M. In the case of an aqueous solution having the same concentrations of uranyl nitrate, nitric acid, and potassium thiocyanate as above but only 0.252 M thorium nitrate, the maximum concentration of sodium sulfate that could be used without thorium sulfate precipitation upon standing was about 0.225 M. Slightly higher sulfate concentrations could be used if the aqueous solution was solvent extracted with the ketone within a short time after preparation of the solution, i. e., before the thorium sulfate would precipitate.

Since it was found that nitric acid has some effect on the efficiency of uranium extraction for a particular alkali thiocyanate concentration using this process, it is preferred that the concentration of nitric acid, if present, be less than 1 M. For example, to obtain approximately equal uranium extraction, there was required approximately two and one-half times as much potassium thiocyanate when the aqueous solution was 1 M nitric acid instead of only 0.4 M nitric acid.

The following examples illustrate various embodiments of this invention.

EXAMPLE I

To 6.2 ml.-portions of an aqueous solution containing 0.8 M thorium nitrate, and 0.16 M uranyl nitrate, potassium thiocyanate was added to provide various concentrations and the resultant aqueous solutions were contacted each with 10 ml. of methyl isobutyl ketone. The extraction data are presented below in Table I.

Table I

SEPARATION OF URANYL FROM THORIUM BY THE THIOCYANATE-KETONE SYSTEM

| KSCN concn., M | Percent $Th^{+4}$ extracted | Percent $UO_2^{++}$ extracted | Separation coefficient [1] | Extraction coefficient of uranium [2] |
|---|---|---|---|---|
| 0.27 | 1.0–1.6 | 64.5 | 138 | 1.1 |
| 0.54 | 1.5–1.8 | 82 | 272 | 2.8 |
| 0.97 | 2.1–3.1 | 89.5 | 503 | 5.3 |
| 1.61 | 5.2–6.2 | 95 | 314 | 11.8 |

[1] The separation coefficient is the ratio of the extraction coefficients of uranium and thorium.
[2] The extraction coefficient is the ratio of concentrations in the ketone and aqueous phases.

The data when plotted show the concentration of potassium thiocyanate at which the greatest separation of uranium from thorium is obtained. When 0.64 M potassium thiocyanate is used, 99% of the uranium will be extracted by batch extractions, whereas only 4.3% of the thorium will be extracted.

EXAMPLE II

Ten ml. of an aqueous solution containing 0.5 M thorium nitrate, 0.1 M uranyl nitrate, 0.6 M potassium thiocyanate, 1 M nitric acid, and 0.5 M sulfuric acid was contacted with an equal volume of methyl isobutyl ketone. One-half of the uranium was extracted. The amount of thorium extracted was so low that an anlysis could not be made, but the amount was estimated to be 0.1% or less. This example shows the effect of sulfate on the thorium extraction. The sulfate ion also competed with the thiocyanate ion for uranyl ions, since the percent uranium extracted was less than when sulfate ion was absent.

EXAMPLE III

Ten ml. of an aqueous solution containing 0.5 M thorium nitrate, 0.1 M uranyl nitrate, 1 M potassium thiocyanate, 1 M nitric acid, and 0.5 M sodium sulfate was contacted with 10 ml. of methyl isobutyl ketone. The principal difference between the aqueous solution in Example II and that in this example was a higher concentration of potassium thiocyanate in the latter. Eighty-three percent of the uranium was extracted while only 0.3% of the thorium was extracted. Thus, the increased amount of potassium thiocyanate increased considerably the degree of uranium extraction without a substantial increase in thorium extraction.

Comparing the data of Examples I, II, and III, it is seen that the presence of sulfate ion either as sulfuric acid or sodium sulfate in an equimolar amount relative to the thorium concentration improves the separation coefficient (as defined in Table I), since the coefficient in Example III was 1600.

Using the conditions of Example III for batch operation 97% of the uranium would be extracted in two batch extractions and only 0.6% of the thorium would be extracted.

EXAMPLE IV

To 10 ml.-portions of an aqueous solution containing 0.252 M thorium nitrate, 0.0974 M uranyl nitrate, 0.2 M nitric acid, and 0.224 M sodium sulfate, there were added different concentrations of potassium thiocyanate. These portions were contacted each with an equal volume of methyl isobutyl ketone. When the concentrations of potassium thiocyanate were 0.25 and 0.5 M, the amounts of uranium extracted into the ketone phase were 35% and 63%, respectively. The degree of thorium extraction was not determined from these experiments because the amounts were so low. Instead identical aqueous solutions were prepared except ammonium nitrate was substituted for uranyl nitrate and ionium ($Th^{230}$) tracer was added to the solution. The percent thorium extracted was measured by determining the amount of ionium, an alpha emitter, in the aqueous phase and ketone phase. The amounts of thorium extracted were 0.015% and 0.14%, respectively.

From the datum in Example IV, using 0.5 M potassium thiocyanate, it was calculated that in a countercurrent extraction six theoretical plates would be required to obtain 99% of the uranium using equal volumes of aqueous solution and the ketone.

Although a better separation of uranium from thorium is obtained at 0.25 M thorium nitrate, extraction solutions containing 0.5 M thorium nitrate could be used to good advantage by installing a stripper column of two or three theoretical plates. Thus, under conditions where 90% of the uranium is extracted with 3% to 5% of the thorium, 99% of the uranium could be extracted with two theoretical plates, and the thorium which is extracted could be removed by a stripper column of two or three plates.

EXAMPLE V

One ml. of an aqueous solution containing 1.2 M ammonium nitrate, 0.2 M nitric acid, about 0.01 M thorium nitrate, 0.01 M sodium sulfate, 0.5 M potassium thiocyanate, and about 60,000 counts per minute of protoactinium, $Pa^{233}$, as the nitrate was prepared. The low concentration of thorium nitrate was present, since the protoactinium nitrate was added as an aqueous solution obtained by dissolving in nitric acid a small portion of neutron-irradiated thorium "carbonate." It is noted that ammonium nitrate was used in this solution in place of the same total concentration of uranium and thorium nitrates, because if thorium and uranium were used their daughter activities would complicate the interpretation. The aqueous solution was contacted with 1 ml. of methyl isobutyl ketone. Only 4.4% of the total beta activity of the aqueous phase was extracted into the ketone. Since the neutron-irradiated thorium used for adding protoactinium contained some fission products, the value of 4.4% was the upper limit of the amount of protoactinium that was extracted. Thus, the datum indicates uranium can be substantially separated from protoactinium.

EXAMPLE VI

A 10-ml. sample of methyl isobutyl ketone was shaken with 10 ml. of an aqueous solution containing 0.504 M thorium nitrate, 1 M potassium thiocyanate, 1 M nitric acid, 0.485 M sodium sulfate and about 0.04 M uranyl nitrate. The uranyl nitrate was obtained by dissolving a neutron-bombarded uranium slug in nitric acid. The beta- and soft gamma-activities of the original aqueous solution and the resultant aqueous solution were determined. From these data there were calculated the decontamination factors which are the ratio of activity in the original aqueous solution to the activity in the aqueous solution after extraction. Beta-activity was measured on a Lauritsen electroscope and the soft gamma-activity was counted through 1.6 g./cm.$^2$ of aluminum and 0.4 g./cm.$^2$ of lead. The beta-decontamination factor was 6.6 and the soft gamma-decontamination factor was 1.5. The beta-ray absorption curve was made and it was identical with the beta-ray absorption curve of zirconium. Thus, zirconium appears to be the main fission element, which is extracted into methyl isobutyl ketone from an aqueous solution containing potassium thiocyanate and nitric acid.

In the cases where the process of this invention is used to separate uranium from other materials it will be desirable to carry out the process several times. The uranyl thiocyanate can be removed from the ketone solution by extraction with a strong inorganic acid, such as strong nitric acid and strong sulfuric acid, with subsequent dilution of the aqueous extraction. The diluted solution is then used in the process. If desired after the dilution at least part of the inorganic acid may be removed, for example, by use of an anion exchange process.

The illustrations have been batch experiments. However, the process is not limited to batch operation. Thus, the extraction may be effected by the use of batch, continuous batch, batch countercurrent, or continuous countercurrent methods. In the case of continuous operation either the aqueous solution or methyl isobutyl ketone may be the dispersed phase, and in any particular case, of course, the other liquid would be the continuous phase.

The foregoing illustrations and embodiments of this invention are not intended to limit its scope, which is to be limited entirely by the appended claims.

What is claimed is:

1. A process for the separation of uranium from an aqueous solution, which comprises adding an alkali thiocyanate to an aqueous solution containing a water-soluble uranyl salt, contacting the resultant solution with methyl isobutyl ketone, and separating the resultant aqueous phase and methyl isobutyl ketone phase containing uranyl thiocyanate.

2. The process of claim 1 wherein the uranyl salt is uranyl nitrate.

3. The process of claim 2 wherein the alkali thiocyanate is potassium thiocyanate.

4. A process for the separation of uranium from a mixture of uranium and thorium, which comprises adding an alkali thiocyanate to an aqueous solution containing a water-soluble uranyl salt and a water-soluble thorium salt, contacting the resultant solution with methyl isobutyl ketone, and separating the resultant aqueous phase contaaining the thorium salt and methyl isobutyl ketone phase containing uranyl thiocyanate.

5. The process of claim 4 wherein the uranyl salt is uranyl nitrate and the thorium salt is thorium nitrate.

6. The process of claim 5 wherein the alkali thiocyanate is potassium thiocyanate.

7. A process for the separation of uranium from a mixture of uranium and thorium, which comprises adding an alkali thiocyanate to an aqueous solution containing a water-soluble uranyl salt, a water-soluble thorium salt, and less than 1 M nitric acid, contacting the resultant solution with methyl isobutyl ketone, and separating the resultant aqueous phase containing the thorium salt and methyl isobutyl ketone phase containing uranyl thiocyanate.

8. A process for the separation of uranium from a mixture of uranium and thorium, which comprises adding an alkali thiocyanate to an aqueous solution containing uranyl nitrate, thorium nitrate, and a water-soluble sulfate, said sulfate having a molar concentration less than the molar concentration of thorium nitrate, contacting the resultant solution with methyl isobutyl ketone, and separating an aqueous phase containing a thorium salt and methyl isobutyl ketone phase containing uranyl thiocyanate.

9. The process of claim 8 wherein the alkali thiocyanate is potassium thiocyanate.

References Cited in the file of this patent

UNITED STATES PATENTS 2,227,833    Hixson et al. _____ Jan. 7, 1941